United States Patent Office

3,655,852
Patented Apr. 11, 1972

3,655,852
METHOD OF FORMING A STABLE VITAMIN E–C GRANULATION
Arnold Koff, West Orange, and Louis Magid, Clifton, N.J., assignors to Hoffmann-La Roche Inc., Nutley, N.J.
No Drawing. Filed Aug. 1, 1969, Ser. No. 846,921
Int. Cl. B01j 2/20
U.S. Cl. 264—115                                    2 Claims

ABSTRACT OF THE DISCLOSURE

A method of forming a granulation of vitamins E and C which can be formed into multivitamin tablets by direct compression is described. Multivitamin tablets containing a high potency of vitamin E in the form of the granulations produced by the method of the invention are stable against oil bleeding and cracking.

BACKGROUND OF THE INVENTION

The inclusion of vitamin E active compounds in coated multivitamin tablet formulations has long been recognized in the art as desirable. The inclusion of such compounds, however, has heretofore been restricted by the instability resulting from the incorporation into tablet formulations of relatively large amounts of an oily form of vitamin E, e.g., from about 10 to about 30 units per tablet. This instability is manifest by the oily vitamin E active compounds bleeding out of the tablet and/or by cracking of the sugar coating, particularly upon storage. This problem is even more pronounced in multivitamin tablets prepared by direct compression. In accordance with this invention, it is now possible to prepare multivitamin tablets by direct compression containing from about 10 to about 30 units of vitamin E which are stable against bleeding of oil and/or cracking of the sugar coating upon storage by incorporating the vitamin E into such tablets in the form of a granulation with ascorbic acid, sodium ascorbate or mixtures thereof.

SUMMARY OF THE INVENTION

This invention relates to sugar coated multivitamin tablets prepared by direct compression and containing vitamin E-active materials in a stabilized form. More particularly, the present invention relates to a method of forming a granulation of a vitamin E-active material with ascorbic acid, an edible metal salt thereof such as sodium ascorbate or mixtures thereof. Sugar coated multivitamin tablets prepared by direct compression with a formulation containing the vitamin E–C granulations produced in accordance with the present invention are stabilized against cracking of the sugar coating and oil seepage.

DETAILED DESCRIPTION OF THE INVENTION

Vitamin E comprises a group of seven natural substances known as tocopherols. These substances are fat soluble, closely related chemical compounds found in vegetable oils such as wheat germ oil, rice oil, soybean oil and the like. Of the group, α-tocopherol possesses the greatest biological activity while its isomers, beta, gamma, delta, epsilon, zeta and eta tocopherols, have vitamin E activity to a lesser extent. The tocopherols and their esters such as, for example, tocopherol acetate, are normally water-insoluble and of an oily nature. These characteristics limit the admixture of the tocopherols with certain other materials for oral administration, e.g., sugar coated multivitamin tablets. It has now been found that sugar coated multivitamin tablets containing high potencies of vitamin E-active materials may be formed by direct compression utilizing a granulation of vitamin E-active material and ascorbic acid, an edible metal salt thereof such as sodium ascorbate or mixtures thereof produced according to the invention.

The advantage inherent in utilizing the vitamin E–C granulations according to the present invention to formulate multivitamin tablets is two-fold. First, the granulations in accordance with the present invention make possible the incorporation of relatively large amounts of vitamin E-active material, e.g., from about 10 to about 30 units, into a multivitamin tablet. Second, as the material which helps stabilize the vitamin E is itself an active vitamin which is universally included in multivitamin formulations, inert adjunct materials normally required to transform the oily vitamin E substances into a form suitable for the formation of multivitamin tablets may be omitted from the formulation. The elimination of these materials results in a saving in costs to the tablet manufacturer, and also affords the production of a somewhat smaller tablet. As is well recognized in the vitamin art, any reduction in tablet size is a distinct improvement as the tablets thereby become easier to take by persons, such as children, who normally have difficulty swallowing a large tablet.

In addition to the production of multivitamin tablets, the vitamin E–C granulations produced by the method of the present invention may be stored as free flowing powders and ultilized for other purposes such as, for example, the enrichment of various foodstuffs.

In general, the vitamin E–C granulations produced by the method of the present invention contain in each 200 mg. from about 50 mg. to about 85 mg. vitamin C, preferably from about 60 mg. to about 70 mg.; and from about 10 to about 30 units of vitamin E activity, preferably from about 15 to about 30 units. This proportion of ingredients allows for the formulation of a stable multivitamin tablet containing from about 10 units to about 30 units of vitamin E activity. It is within the purview of the present invention to combine vitamin E–ascorbic acid granulation and vitamin E-ascorbic acid edible metal salt granulation in any proportions in a single multivitamin tablet.

The novel granulations of the present invention are prepared generally by the following procedure.

In a preferred method, a powder premix is formulated by placing ascorbic acid, sodium ascorbate or mixtures thereof and the oily vitamin E active material in a suitable mixer with small amounts of inert binders such as, for example, pregelatinized starch, finely divided silica and tricalcium phosphate and thoroughly mixing. The powder mixture is then fed into an extruder with a wetting solution comprising, for example, a dilute aqueous solution of lactose. The extrudate is placed on trays and dried at 50° C. As an alternate procedure, the wet granulation can be dried in a twin cone vacuum dryer at 50° C. and 20–40 mm. vacuum. The dried granulation is then passed through a comminuting machine to produce a fine premix suitable for the production of multivitamin tablets by direct compression.

The multivitamin tablets prepared in accordance with the present invention can contain, in addition to the other vitamins commonly included in such preparations, many of the conventional adjuvants of the prior art. Thus, for example, the multivitamin tablets of the present invention can contain inert binders such as, for example, pregelatinized starch, gum acacia, polyvinyl-pyrrolidone and the like, lubricants such as, for example, a saturated fatty acid having a carbon chain of from 12 to 18 carbon atoms or an alkaline earth metal salt thereof. Stearic acid and calcium stearate are preferred in the production of multivitamin tablets by direct compression in accordance with the present invention. The tablets may, in addition, contain other conventional ingredients such as antioxidants, preservatives and inert diluents such as, for example, spray dried lactose, microcrystalline cellulose and the like.

As has been stated, the vitamin E–C granulations according to the present invention contain from about 50 mg. to about 85 mg., preferably from about 60 mg. to about 70 mg. vitamin C in each 200 mg. of granulation. This quantity is, in some formulations, insufficient to satisfy the vitamin C requirement in multivitamin formulations known in the art. Hence, amounts of ascorbic acid or an edible metal salt thereof in addition to that included in the novel granulations of the present invention may be incorporated into the multivitamin tablets made therewith. This additional vitamin C, as well as other vitamins included in multivitamins produced in accordance with the present invention, preferably is in a form suitable for production of tablets by direct compression. Examples of such forms include dense grade niacinamide, free flow crystals of thiamine mononitrate and the like.

The multivitamin tablets according to the present invention are prepared by direct compression which is simply the blending of flowable tablet materials into a homogeneous mixture which is thereafter compressed into tablets. The success of a direct compression process is dependent of the tabletting characteristics of the active ingredients and excipients in the formula. All ingredients must be in a reasonably flowable and compressible form with a bulk density and particle size suitable for direct compression. In addition to the vitamin forms alluded to above, greatly improved tablet excipients have recently been developed which make possible the production of superior multivitamin tablets by direct compression. Examples of such excipients include spray dried acacia, direct tablet grade lactose, microcrystalline cellulose, spray dried blends of sugars and acacia and the like.

In general, the multivitamin tablets in accordance with the present invention are prepared by blending the novel E–C granulation formed according to the invention with the other dry materials in a suitable mixer and compressing the thus-formed homogeneous mass into tablets.

The tablets are sealed and sugar coated in a conventional manner, e.g., the tablets are sealed with a sealant such as shellac, shellac-polyvinylpyrrolidone, shellac-stearic acid or the like by application in a suitable solvent such as, for example, ethyl alcohol, and given a subcoating with a mixture such as, for example, gum arabic, sucrose, gelatin and water, alternating with a dusting powder such as, for example, terra alba. The tablet surface is then smoothed by a coating of sugar which is applied as an aqueous syrup. After application of the smoothing coating, the tablets are polished with a polishing solution or polishing wax composition. The tablets may be colored in a number of ways such as, for example, building up color by having pigment dispersed in the subcoating material or by the use of special coloring coating prior to the polishing step. These steps and the choice of specific materials utilized therein are considered to be well within the purview of a person skilled in the art.

In order to determine the stability of multivitamin tablets prepared in accordance with the present invention, sample tablets were stored at about 45° C. for 90 days. No cracking of the sugar coating or oil seepage was noted at the end of this time. Potency assay of the vitamin components of the tablets showed normal stability patterns for individual vitamins.

The following examples illustrate the invention which is not limited to the specific embodiment shown therein.

Example 1

One kilogram of a granulation of vitamin E and ascorbic acid was prepared as follows:

In a suitable mixer was placed a premix of 163.0 grams dl-α-tocopheryl acetate, 315.0 grams ascorbic acid universal fines, 219.0 grams tricalcium phosphate, 125.0 grams pregelatinized starch and 175.0 grams microfine silica base. The powder mixture was agitated until completely uniform and then transferred to an extrusion apparatus having means to mix and disperse divergent incoming ingredients at a metered rate. A suitable machine of this type is a Reitz Extructor. The powder mixture is fed into the extruder at a metered rate so that it is thoroughly mixed and extruded with 300.0 grams of distilled water in which had been dissolved 3.0 grams lactose. The extrudate of wet granulation was dried on paper lined trays at about 50° C. The dried granulation was then passed through a Fitzpatrick Comminuting Machine fitted with a No. 2A screen, using thin knives at medium speed. The granulation contains 60 mg. of ascorbic acid and 30 units of vitamin E activity per each 200 mg. unit weight, with normal excesses.

Example 2

In a manner entirely analogous to that set forth in Example 1, a 3000 gram bath of a granulation of vitamin E and sodium ascorbate was prepared utilizing the following quantities of ingredients:

| Ingredient: | Quantity (grams) |
|---|---|
| Microfine silica base | 480.0 |
| dl-α-Tocopheryl acetate | 473.0 |
| Sodium ascorbate | 1102.0 |
| Tricalcium phosphate | 627.0 |
| Pregelatinized starch | 310.0 |

The wetting solution utilized to form the extrudate consisted of 900.0 grams of distilled water into which had been dissolved 8.0 grams ascorbic acid.

The granulation contains 70 mg. of sodium ascorbate equivalent to 60 mg. ascorbic acid and 30 units of vitamin E activity per 200 mg. unit weight, with normal excesses.

Example 3

Therapeutic and maintenance multivitamin tablets were produced by direct compression utilizing the following formulations:

| Ingredient | A | B | C | D | E | F |
|---|---|---|---|---|---|---|
| Thiamine mononitrate, fine granular | 11.00 | 11.00 | 11.00 | 1.50 | 1.50 | 1.50 |
| Riboflavin | 11.00 | 11.00 | 11.00 | 1.87 | 1.87 | 1.87 |
| Pyridoxine HCl | 5.50 | 5.50 | 5.50 | 2.20 | 2.20 | 2.20 |
| Vitamin B₁₂ (0.1 percent in gelatin) | 6.25 | 6.25 | 6.25 | 3.40 | 3.40 | 3.40 |
| Niacinamide, dense | 110.00 | 110.00 | 110.00 | 23.10 | 23.10 | 23.10 |
| Calcium pantothenate | 30.00 | 30.00 | 30.00 | 3.75 | 3.75 | 3.75 |
| Sodium ascorbate, 95 percent granulation | 195.00 | 185.00 | 185.00 | 14.00 | | |
| Vitamin A acetate powder, 500 million units/gram | 62.50 | 62.50 | 62.50 | 13.00 | 13.00 | 13.00 |
| Vitamin D₁₂ powder, 850 million units/gram | 0.50 | 0.50 | 0.50 | 0.50 | 0.50 | 0.50 |
| Ascorbic acid, Vitamin E granulation (Example 1) | | | 200.00 | | 210.00 | 200.00 |
| Sodium ascorbate, Vitamin E granulation (Example 2) | 100.00 | 200.00 | | 210.00 | | |
| Microcrystalline cellulose | | 50.00 | | 10.00 | 0.68 | |
| Dicalcium phosphate dihydrate, unmilled | 63.00 | | 13.00 | | 11.68 | 4.43 |
| Stearic acid | 5.25 | 5.25 | 5.25 | 4.00 | 4.00 | |
| Magnesium stearate | | | | | | 11.25 |
| Weight of final tablet | 650.00 | 627.00 | 650.00 | 278.00 | 275.00 | 265.00 |

The riboflavin, pyridoxine hydrochloride and calcium pantothenate were passed through a Fitzpatrick mill equipped with a No. 2 screen. The resulting material was then admixed and thoroughly blended with the remaining ingredients listed in the formulations. Thereafter, the homogeneous mixture was compressed into tablets of the weights indicated.

The tablets thus formed were sealed with shellac and subcoated with acacia syrup alternating with a terra alba dusting powder. The tablets from each formulation were smoothed, waxed and polished utilizing conventional procedures.

Groups of tablets of each formulation were stored at 45° C. for 90 days. It was observed that, without exception, those tablets stored at 45° C. showed no evidence of oil seepage or cracking of the sugar coating. Tablets from each group were assayed for potency of each of the vitamin components. The assays showed no departure from normal stability patterns long established for conventional multivitamin tablets. The incorporation of the novel vitamin E–C granulations as described herein into multivitamin formulations renders the finished tablets stable in regard to oil seepage and cracking of the sugar coating without adversely affecting vitamin potency.

We claim:
1. In a process of producing a sugar-coated multivitamin tablet by direct compression of a granulation containing an oily vitamin E active substance, the improvement comprising stabilizing said formed tablet against seepage of said oily vitamin E active substance and cracking of said sugar coating during storage of said formed tablet, comprising:
   (a) extruding a homogeneous composition consisting of water, an amount of said oily vitamin E active substance sufficient to provide about 30 units of vitamin E activity in each tablet and a compound selected from the group consisting of ascorbic acid in an amount of about 50–80 mg. per 200 mg. of said composition, an edible metal salt of ascorbic acid in an equivalent amount and mixtures thereof,
   (b) drying the extruded composition,
   (c) comminuting the dried composition to form a granulation in a flowable and compressible form and a bulk density and particle size suitable for direct compression into tablets,
   (d) tableting said granulation by direct compression, and
   (e) sealing and sugar coating said tablet.
2. The progress in accordance with claim 1 wherein said edible metal salt of ascorbic acid is the sodium salt.

References Cited

UNITED STATES PATENTS

| 3,146,493 | 9/1964 | Steinle et al. | 264—141 |
| 3,373,235 | 3/1968 | Rice | 264—143 |
| 3,424,842 | 1/1969 | Nürnberg | 264—109 |

OTHER REFERENCES

Jon E. Browning, Agglomeration, Chemical Engineering Dec. 4, 1967, pp. 147–153.

ROBERT F. WHITE, Primary Examiner

J. R. HALL, Assistant Examiner

U.S. Cl. X.R.

264—141